United States Patent
Paris et al.

(10) Patent No.: US 9,158,930 B2
(45) Date of Patent: Oct. 13, 2015

(54) FACILITATING SECURE FILE CREATION

(75) Inventors: Eric Paris, Raleigh, NC (US); Daniel J. Walsh, Marlborough, MA (US)

(73) Assignee: Red Hat, Inc., Raleigh, NC (US)

( * ) Notice: Subject to any disclaimer, the term of this patent is extended or adjusted under 35 U.S.C. 154(b) by 79 days.

(21) Appl. No.: 13/611,741

(22) Filed: Sep. 12, 2012

(65) Prior Publication Data

US 2014/0075495 A1    Mar. 13, 2014

(51) Int. Cl.
*H04L 29/06* (2006.01)
*G06F 21/62* (2013.01)

(52) U.S. Cl.
CPC .... *G06F 21/6209* (2013.01); *G06F 2221/2113* (2013.01); *G06F 2221/2141* (2013.01); *G06F 2221/2145* (2013.01); *G06F 2221/2149* (2013.01)

(58) Field of Classification Search
CPC .......... G06F 17/30171; G06F 21/6218; G06F 17/30144; G06F 17/30389; H04L 63/20; H04L 63/102
See application file for complete search history.

(56) References Cited

U.S. PATENT DOCUMENTS

| | | | | |
|---|---|---|---|---|
| 2009/0106815 | A1* | 4/2009 | Brodie et al. | 726/1 |
| 2009/0271844 | A1* | 10/2009 | Zhang et al. | 726/2 |
| 2010/0263060 | A1* | 10/2010 | Charbonneau et al. | 726/30 |
| 2012/0066272 | A1* | 3/2012 | Drepper | 707/822 |

OTHER PUBLICATIONS

Stephen Smalley, Configuring the SELinux Policy, Feb. 2005, pp. 1-33.*

* cited by examiner

*Primary Examiner* — Kambiz Zand
*Assistant Examiner* — Ghodrat Jamshidi
(74) *Attorney, Agent, or Firm* — Lowenstein Sandler LLP

(57) ABSTRACT

An operating system identifies a request of a process to create, in a file system of the computing device, a new object. The operating system creates an object label for the new object, identifies one or more security policy rules applicable to the process, and verifies whether the process is authorized to create the new object with the object label in the file system of the computing device using the applicable security policy rules. When the process is authorized to create the new object with the object label, the operating system creates the new object with the object label in the file system of the computing device. When the process is not authorized to create the new object with the object label, an error message is generated.

23 Claims, 6 Drawing Sheets

FACILITATING SECURE FILE CREATION

TECHNICAL FIELD

Embodiments of the present invention relate in general to operating systems and in particular to generating a Security Enhanced Linux (SELinux) security policy based on file name translations used for security.

BACKGROUND

SELinux is a security operation system initiative by the US National Security Agency which attempts to improve security and prevent, for example, malicious software to obtain control of important system resources. SELinux typically provides for an object (e.g., a file system object such as a directory or a file) to be assigned a security context or a label which encapsulates the security attributes associated with the object.

SELinux uses security control mechanisms that can provide the accesses that a program needs to perform its task. To implement such security controls, SELinux typically provides a security label by associating access control attributes of the form user:role:type to objects.

Security labels may be assigned to the objects in several ways. For example, a primary method for assigning a security label to an object is for the object to adopt the label of the parent directory. A second method for assigning a label to an object can be through the use of a transition rule or policy. In this case, an example of a transition rule or policy may be: if a process which creates an object is called "A", and if the directory in which the object is created is called "B", then the object that is created is labeled "C". A third method for assigning a label to an object can be through the use of a rule assignment within a process, such that, for example, if a certain process creates an object, then the object is labeled "D".

In SELinux, a newly created object may need to have a label that is different from the label of the parent directory or the label that is applied by the transition rule. For example, an administrator may go into the /root directory and create the .ssh directory. The directory may get created with the label admin_home_t, however, a policy may require the directory to be labeled ssh_home_t. If the label is not corrected, when the user tries to use the content of the .ssh directory, a process may fail to read the content of the directory because the content of the .ssh directory is mislabeled (e.g., the process "sshd" is not permitted to read files labeled admin_home_t.)

In another example, a user may create a public_html directory in his or her home directory. The default label for content in the home directory may be user_home_t, however, the public_html directory may be required to be labeled http_user_content_t, otherwise an apache process (e.g., httpd_t) will not be permitted to read the content. A system administrator usually should manually correct such mislabeling, which is inconvenient and time consuming and creates a possibility of human errors.

In addition, a process can typically create any new file or directory in a parent directory if such a new file or directory did not exist in the parent directory. For example, a malicious process could create a random new file or directory in a home directory, mislabel it as an authorized object, and then prevent the home directory from working or cause other problems in the file system.

BRIEF DESCRIPTION OF THE DRAWINGS

Embodiments of the present invention are illustrated by way of example, and not by way of limitation, and can be more fully understood with reference to the following detailed description when considered in connection with the figures in which.

DETAILED DESCRIPTION

A method and system are described for providing an SELinux system implementing extended security policy models for enforcement.

In one embodiment, a policy rule for creating a security label for a newly created object is defined using the label of the process, the class of the newly created object, the label of the parent object, and the name of the new object. As used herein, the term "object" may be referred to as, but not limited to, for example, a file, a directory, a sub-directory, a memory location, etc.

In one embodiment, the policy rule may be compiled by a policy language compiler and included in an operating system package which may be distributed and installed on computer devices. In one embodiment, the policy rule may be a file transition rule of an SELinux policy. In one embodiment, an SELinux policy rule may define an SELinux label for a newly created object.

During execution, the kernel may identify a request of a process to create a new object in the file system. The kernel may identify a policy rule applicable to the new object by using a label of the process, a label of the parent object pertaining to the new object, a class of the new object, and the name of the new object. In one embodiment, the parent object pertaining to the new object is a file directory.

After identifying the policy rule, the kernel may create a security label for the new object using the identified policy rule. The kernel may further identify a security policy rule applicable to the process to verify whether the process is authorized to create the new object with the above label in the target directory. If so, the kernel creates the new object in the target directory and associates the new object with the label. If not, the kernel generates an error message.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
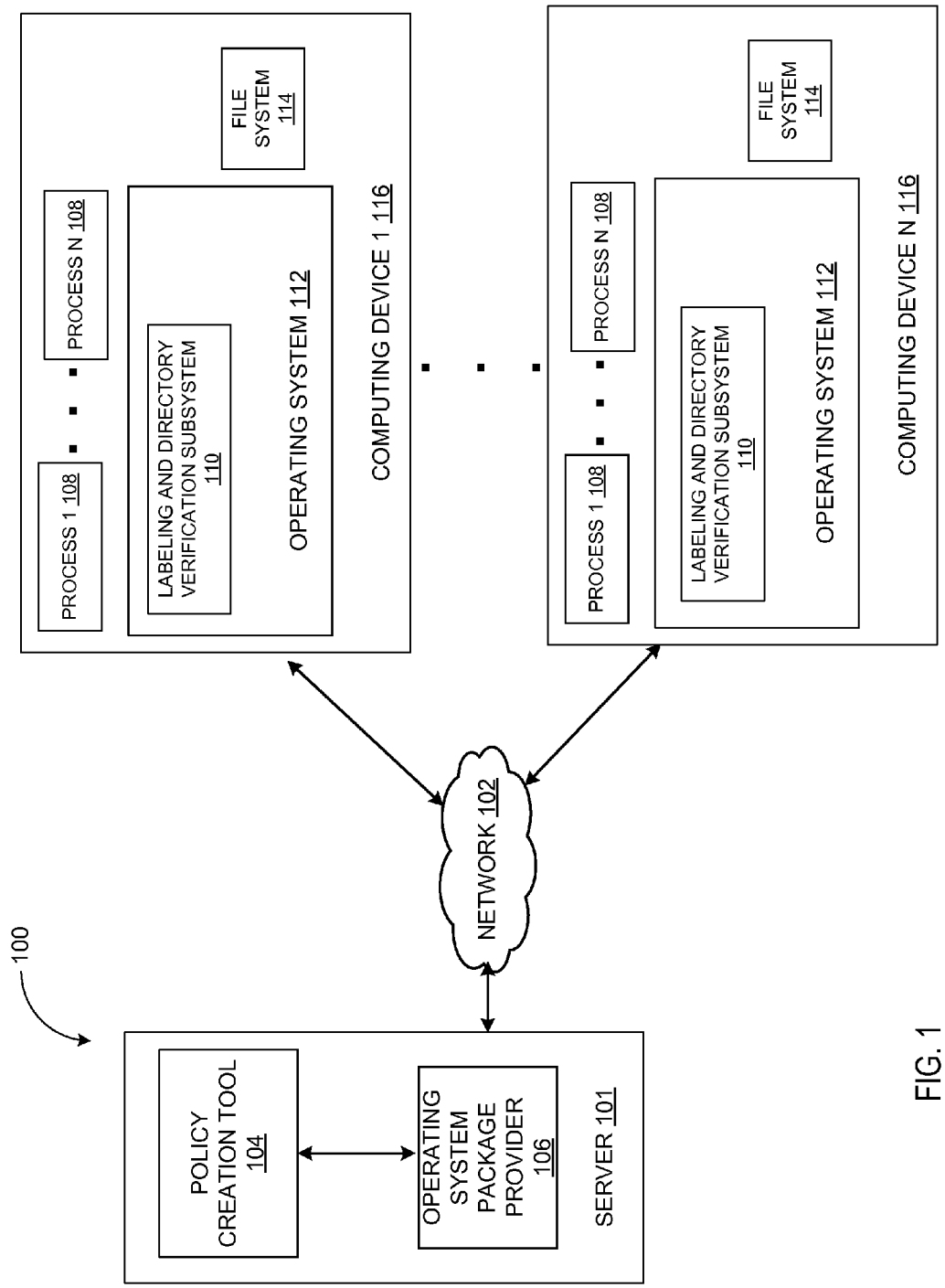
FIG. 1 is a block diagram of an exemplary system architecture in which embodiments of the invention may operate.

FIG. 1 illustrates a block diagram of one embodiment of an exemplary system architecture 100 in which embodiments of the present invention may operate. The system architecture 100 represents a computing system environment according to any embodiment described herein. The system architecture 100 includes a server 101 hosting a policy creation tool 104 and an operating system package provider 106. The policy creation tool 104 may facilitate creation of security policies. In some embodiments, the security policies are SELinux policies, and the policy creation tool 104 may include, for example, libsepol which may provide an application programming interface for the manipulation of SELinux policies and may be used by checkpolicy (the policy compiler) and similar tools, as well as by programs such as load_policy that may need to perform specific transformations on policies.

The server may 101 be a personal computer (PC), a server computer, a personal digital assistant (PDA), a smart phone, a laptop computer, or any machine capable of executing a set of instructions (sequential or otherwise) that specify actions to be taken by that machine. In another embodiment, the policy creation tool 104 and the operating system package provider 106 may reside on different servers.

The server 101 may be communicatively coupled to computing devices 116 (e.g., computing devices 1-N) over a network 102. The network 102 may be, for example, a private network (e.g., a local area network (LAN), a wide area network (WAN), intranet, etc.), a corporate network (e.g., a private network for an organization such as a corporation), and/or a public network (e.g., the Internet).

The computing devices 116 may include computing devices that have a wide range of processing capabilities such as PCs, PDAs, smart phones, laptop computers, tablets, netbooks, etc, and/or any machine capable of executing a set of instructions (sequential or otherwise) that specify actions to be taken by that machine. The computing devices 116 may access the operating system package provider 106 over the network 102. In one embodiment, the computing devices 116 may be mobile computing systems including but not limited to, laptops, smart phones, PDAs, tablet computers, netbook computers, etc. In one embodiment, the operating system package provider 106 may distribute to each of computing devices 116 an operating system package which may include an operating system and a set of compiled policy rules. In one embodiment, the distributed operating system package may include one or more compiled policy rules that are created by the policy creation tool 104. As will be discussed in more detail below, a policy rule for creating a security label for a new object may specify that the security label for the new object should be based on the label of a process creating the new object, the class of the new object, the label of the parent object of the new object, and the name of the new object. In one embodiment, a security policy rule applicable to the process and the new object may verify whether the process is authorized to create the new object with the label in the target directory.

In one embodiment, the computing devices 116 may include processes 108 (e.g., processes 1-N). A process may be an executable program and may consist of the executing program code, a set of resources such as open files, internal kernel data, an address space, one or more threads of execution, and a data section containing global variables. Each process may have process descriptors associated with it which may hold the information used to keep track of a process in memory. The various pieces of information stored about a process may include, but are not limited to, process identifier (PID), state, parent process, children, siblings, processor registers, list of open files and address space information.

In one embodiment, each of the computing devices 116 may include an operating system 112. Each operating system 112 may use mandatory access control (MAC) mechanisms. Mandatory access control mechanisms may provide a requestor (e.g., a process, an application and/or a user) with the minimum amount of privileges required to complete a task. For example, a requestor using and/or operating in the operating system 112 may attempt to perform an operation on an object which the operating system 112 has access to. The operating system 112 may provide the requestor with the least amount of access/privileges possible to perform the operation. In another embodiment, the mandatory access control mechanisms may prevent requestors from performing unauthorized operations on objects and/or gaining unauthorized access to objects. For example, the mandatory access control mechanism may prevent a process from overwriting data in another process's memory location. In another example, the mandatory access control mechanisms may prevent a user from installing an unauthorized program or accessing system settings or files.

In one embodiment, requestors and objects may each have one or more security attributes. When a requestor attempts to access and/or operate on an object, the mandatory access control mechanisms of the operating system 112 may examine the security attributes of the requestor and the object the requestor is attempting to access. The mandatory access control mechanisms may also examine one or more user roles or contexts to determine whether the requestor is allowed to access the object and allow/deny a requestor access to an object based on the role or context. For example, an "administrator role" may provide a user with full or partial access to a computing system, while a "guest role" may only provide a user with less privileged access to files and settings of a computing system. In another embodiment, the operations which may be controlled by the mandatory access control mechanisms and the contexts/roles may include, but are not limited to accessing files and directories, accessing hardware, accessing ports, accessing objects, accessing memory and memory locations, installing applications, and executing applications, processes, and/or threads.

In one embodiment, the mandatory access control mechanisms may be part of the operating system 112 (e.g., part of the kernel of the operating system 112). In another embodiment, the mandatory access control mechanisms may include one or more software modules and/or applications which work in conjunction with the operating system 112 to allow/deny requestors access to objects. Examples of operating systems which may use mandatory access control mechanisms include, but are not limited to, SELinux, Windows 7®, Windows Vista®, Mac OS®, FreeBSD®, and Trusted Solaris®.

In one embodiment, the operating system 112 includes a labeling and directory verification subsystem 110 for extending security policies (e.g., SELinux security policies) and for providing further refinement of the mandatory access control mechanisms. Alternatively, the labeling and directory verification subsystem 110 may not be part of the operating system 112 but is instead a dedicated application or part of another application running on top of the operating system 112. In one embodiment, the operating system 112 may identify a request of a process 108 to create a new object to reside within the file system 114 (e.g., in a target directory). In one embodiment, the file system 114 may be included within the computing devices 116. A file system may be a method for storing and organizing computer files and the data they contain to make it easy to find and access them. For example, file system 114 may use a data storage device such as a flash drive, a hard disk or CD-ROM and may involve maintaining the physical location of the files.

In one embodiment, the labeling and directory verification subsystem 110 may be configured to identify a policy rule which may be applicable to the requested object. The labeling and directory verification subsystem 110 may create a label for the new object by using an applicable policy rule. As will be discussed in more detail below, the labeling and directory verification subsystem 110 may create a label for the new object based on the label of a process creating the new object, the class of the new object, the label of the parent object of the new object, and the name of the new object. The labeling and directory verification subsystem 110 may then verify whether the process 108 is authorized to create the new object in the target directory. If so, the new object is created in the target directory and is associated with the above label. If not, an error message is generated. Embodiments of the labeling and directory verification subsystem 110 are discussed in further detail below in conjunction with FIGS. 2-5.

The computing device 116 may subsequently receive a request from a user to access the new object. In response to the request, the operating system 112 may send to a security server (not shown) an access control decision request, based on the created label that is associated with the new object. The security server may determine whether or not access to the new object should be allowed or denied based on the label of the new object. The computing device 116 may then receive, from the security server, the decision to allow or deny the user access to the new object, and execute the received decision from the security server.

Figure 2:
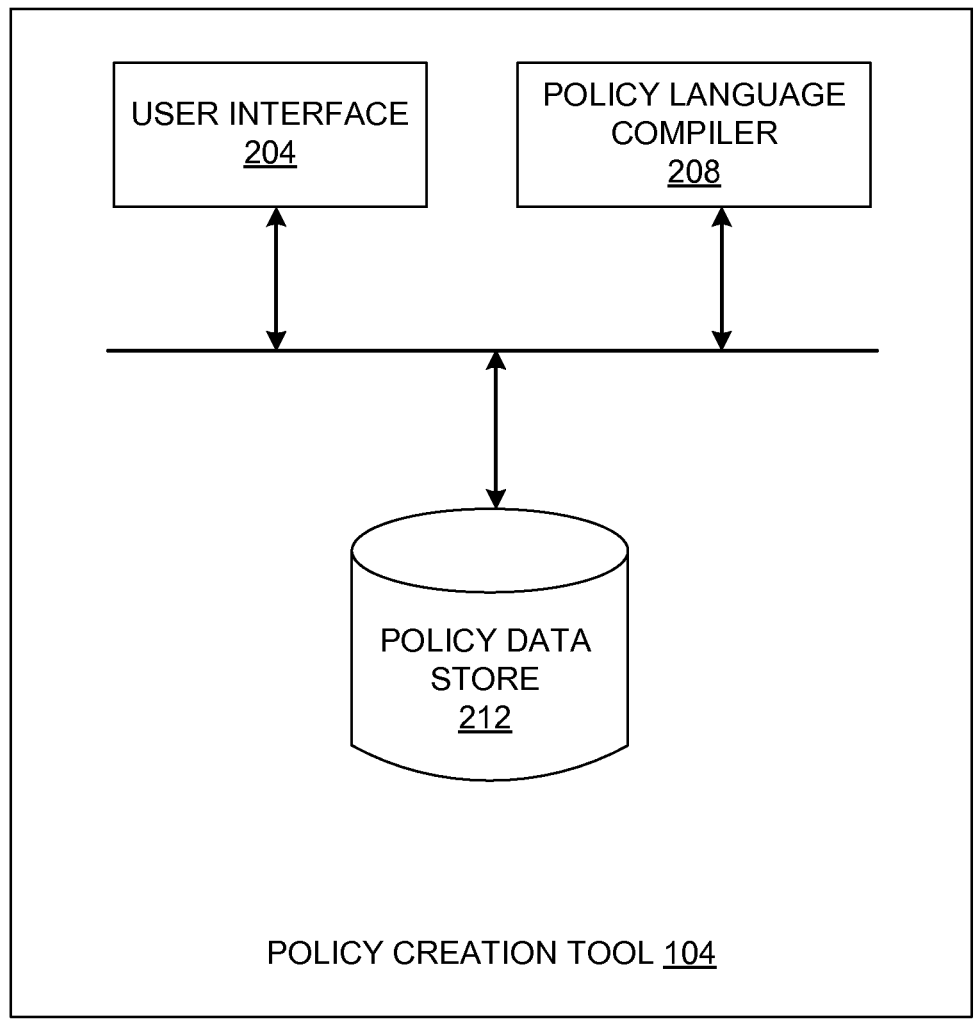
FIG. 2 is a block diagram of one embodiment of a policy creation tool.

FIG. 2 is a block diagram of one embodiment of a policy creation tool 104. The policy creation tool 104 may include a user interface 204, a policy language compiler 208, and a policy data store 212. The components of the policy creation tool 104 may represent modules that can be combined together or separated into further modules, according to various embodiments. The policy data store 212 may be part of a single data structure or each of them may represent a single data structure or multiple data structures (tables, databases, repositories, files, etc.) residing on one or more mass storage devices, such as magnetic or optical storage based disks, solid-state drives or hard drives.

In one embodiment, the user interface 204 may be used by a user or an administrator to input information for creating a new policy rule for the operating system 112. For example, the user or administrator may input, via the user interface 204, policy rules for creating labels for new objects based on the label of a process which will be creating a new object, the class of the new object to be created by the process, the label of the parent pertaining to the new object, and the name of the new object. The class of the new object may be, for example, a file, a directory, a character file (e.g., chr_file) or a block file (e.g., blk_file). The user or administrator may also input, via the user interface 204, policy rules for controlling which objects may be created in a certain directory or file system. Exemplary policy rules are discussed in further detail below with reference to FIG. 4.

In one embodiment, the policy language compiler 208 is used to compile the new policy rule for the operating system 112, based on the information that that was provided through the user interface 204 by the user or administrator. The compiled new policy rule may be stored in the policy data store 212. The operating system package provider 106 may include compiled system rules in an operating system package and distribute the resulting operating system package to computing devices 116.

Figure 3:
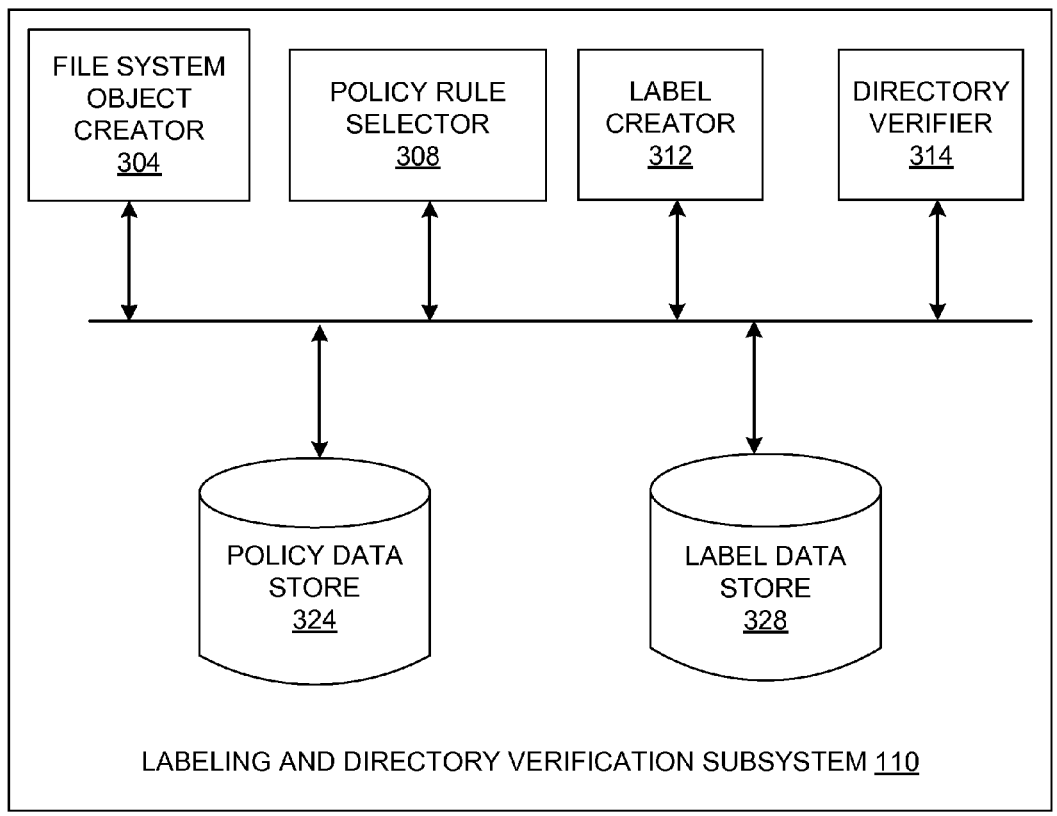
FIG. 3 is a block diagram of one embodiment of a labeling and directory verification subsystem in which embodiments of the invention may operate.

FIG. 3 is a block diagram of one embodiment of a labeling and directory verification subsystem 110. The labeling and directory verification subsystem 110 may be a module operating within operating system 112 or within an application running on top of the operating system 112 on computing device 116. The labeling and directory verification subsystem 110 may include a file system object creator 304, a policy rule selector 308, a label creator 312, a directory verifier 314, a policy data store 324, and a label data store 328. In one embodiment, the compiled new policy rule, as discussed above with reference to FIGS. 1 and 2, may be transmitted to the computing devices 116 via, for example, network 102. In one embodiment, the compiled new policy rule may reside within the policy data store 324. The components of the labeling and directory verification subsystem 110 may represent modules that can be combined together or separated into further modules, according to various embodiments. Any combination of the policy data store 324, and the label data store 328 may be part of a single data structure or each of them may represent a single data structure or multiple data structures (tables, databases, repositories, files, etc.) residing on one or more mass storage devices, such as magnetic or optical storage based disks, solid-state drives or hard drives.

The file system object creator 304 may be configured to identify a request from, for example, a process 108, to create a new object. In one embodiment, the new object is requested to reside in a certain target directory of the file system 114. The request may specify the label of the process which creates the new object, the label of the parent object pertaining to the new object, the class of the new object and the name of the new object.

The policy rule selector 308 may identify a policy rule which may reside in the policy data store 324. The policy rule selector 308 may identify and select a policy rule that is applicable to the new object that is created by a process 108. The policy rule selector 308 may use the following information for identifying and selecting of the applicable policy rule: 1) the label of the process 108 that creates the new object; 2) the label of the parent object pertaining to the new object; 3) the class of the new object; and 4) the name of the new object.

In one embodiment, the name of the new object may be the base file name and not the path name. Alternatively, the name of the new object may be the entire path name of the new object, including the base name of the new object. Yet alternatively, the name of the new object may be a portion of the path name of the new object.

In one embodiment, the label creator 312 uses the policy rule that is applicable to the new object, which was identified and selected by the policy rule selector 308, to create a label for the new object. In one embodiment, the directory verifier 314 may further find, in the policy data store 324, a security policy rule applicable to the process 108 and the new object to verify whether the process 108 is authorized to create the new object with the above label in the target directory. The verification may be based on the label of the process 108, the label of the target directory, the label of the new object and the class of the new object. If the verification is successful, the directory verifier 314 creates the new object, associates it with the above label and stores the label in the label data store 328.

Figure 4:
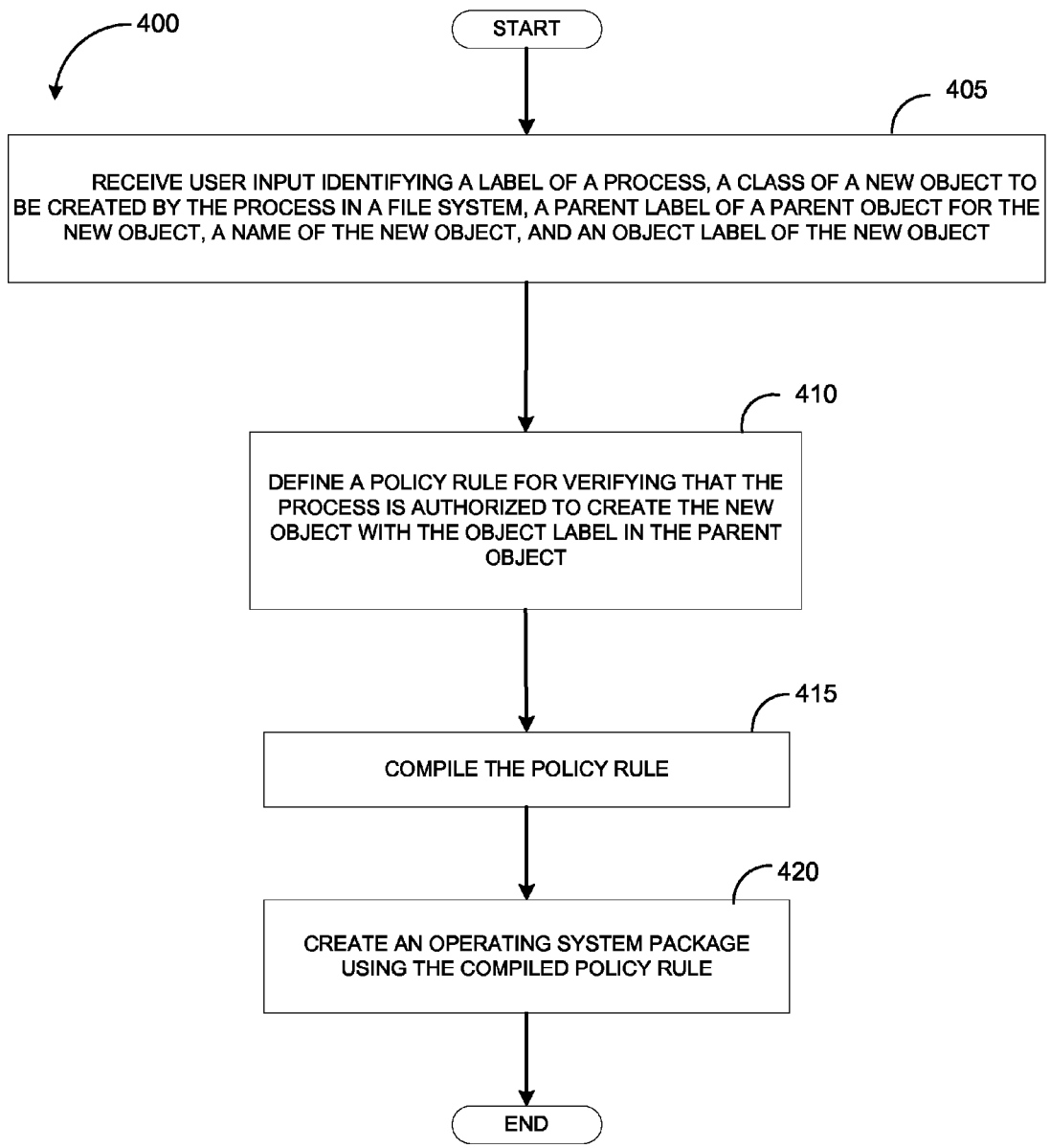
FIG. 4 is a flow diagram illustrating a method for creating an operating system package using a compiled policy rule, in accordance with one embodiment.

FIG. 4 is a flow diagram illustrating a method 400 for creating an operating system package using a compiled policy rule, in accordance with one embodiment. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 may be performed by the policy creation tool 104 of FIGS. 1 and 2 and by the operating system package provider 106 of FIG. 1.

Referring to FIG. 4, the method 400 starts with the policy creation tool 104 receiving information from user or an administrator via, for example, the user interface 204. At block 405, the policy creation tool 104 may receive input from a user identifying a label of a process; a class of a new object authorized to be created by the process in a file system; a parent label of a parent object for the new object; a name of the new object; and an object label of the new object.

In response, at block 410, the policy creation tool 104 may define a policy rule 108 for verifying whether the process is authorized to create the new object with the object label in the parent object.

For purposes of illustration and not limitation, the following are examples of a policy rule for creating a label for a new object using the name of the new object. For example, a policy rule may specify that if the unconfined_t user process creates the ".ssh" directory in a directory labeled admin_home_t, then the new directory should be labeled "ssh_home_t." In particular, this policy rule may be expressed as follows:

ssh_home_t.filetrans_pattern(unconfined_t, admin_home_t, dir, ssh_home_t, ".ssh")

In another example, if the staff_t user process creates a directory named public_html in a directory labeled user_home_dir_t, then the new directory should be labeled as "http_user_content_t." In particular, this policy rule may be expressed as follows:

http_user_content_t.filetrans_pattern(staff_t, user_home_dir_t, dir, http_user_content_t, "public_html")"

Also for purposes of illustration and not limitation, the following are examples of a policy rule for specifying that the label of the new object is authorized to be created in a target directory. For example, a user may specify that a process "NetworkManager" can only create the "resolv.conf" file in a directory labeled etc_t; or a confined firefox can only create the .mozilla directory in a user's home directory. Additional examples are as follows:

type_transition thumb_t user_home_dir_t: file thumb_home_t "missfont.log";
type_transition thumb_t user_home_dir_t: dir thumb_home_t ".thumbnails";
type_transition thumb_t user_home_dir_t: dir gstreamer_home_t ".gstreamer-12";
type_transition thumb_t user_home_dir_t: dir gstreamer_home_t ".gstreamer-10";
type_transition thumb_t user_home_dir_t: dir gstreamer_home_t ".gstreamer-0.10";
type_transition thumb_t user_home_dir_t: dir gstreamer_home_t ".gstreamer-0.12";

The above examples specify that thumbnailers running as thumb_t can only create a file labeled missfont.log or directories labeled .thumbnails or .gstreamer-* in the home directory, and may be used, for example, as a resource for defining a policy rule for verifying that a process is authorized to create a new object with an object label in a parent object.

At block 415, the policy creation tool 104 may compile the new policy rule. At block 420, the operating system package provider 106 may create an operating system package using the compiled policy rule. The operating system package provider 106 may distribute the operating system package, which includes the compiled set of policy rules, to computing devices 116 via, for example, the network 102.

Figure 5:
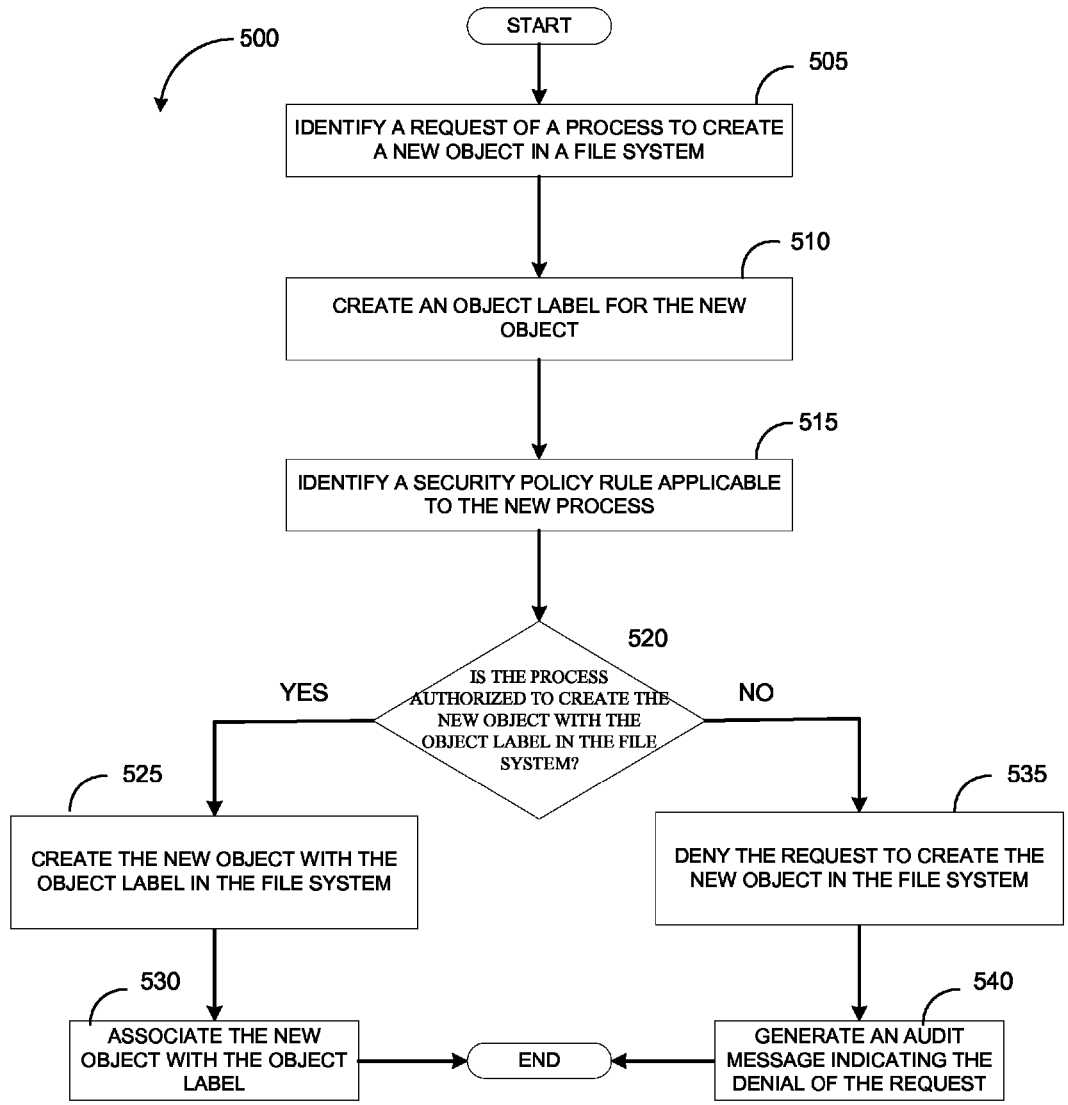
FIG. 5 is a flow diagram illustrating a method for identifying an applicable policy rule and creating a label for a new object using the applicable policy rule, in accordance with another embodiment.

FIG. 5 is a flow diagram illustrating a method 500 for identifying an applicable policy rule and creating a label for a new object using the applicable policy rule, in accordance with one embodiment. The method 500 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 500 may be performed by the labeling and directory verification subsystem 110 of FIGS. 1 and 3.

Referring to FIG. 5, the method 500 starts with the file system object creator 304 identifying a request of a process 108 to create a new object in a target directory or file system of the computing device (block 505). At block 510, the labeling and directory verification subsystem 110 creates an object label for the new object (e.g., using an object label policy rule applicable to the new object as was discussed in more detail above). At block 515, the labeling and directory verification subsystem 110 identifies one or more security policy rules applicable to the process 108. In an example embodiment, the policy rules may specify the parameters for performing the request such as the label of the process 108, the label of the parent of the new object, the class of the new object, the name of the new object, and the label of the new object.

At block 520, the labeling and directory verification subsystem 110 verifies whether the process 108 is authorized to create the new object with the object label in the file system using the applicable security policy rules. If so, at block 525, the label creator 312 may create the new object with the object label in the file system. At block 530, the operating system 112 may associate the new object with the object label that was created at block 525, and the method 500 ends.

If at block 520 the process 108 is not authorized to create the new object with the object label in the file system, then at block 535 the request to create the new object in the file system is denied. In an embodiment, at block 540 an audit message is generated indicating the denial of the request.

Figure 6:
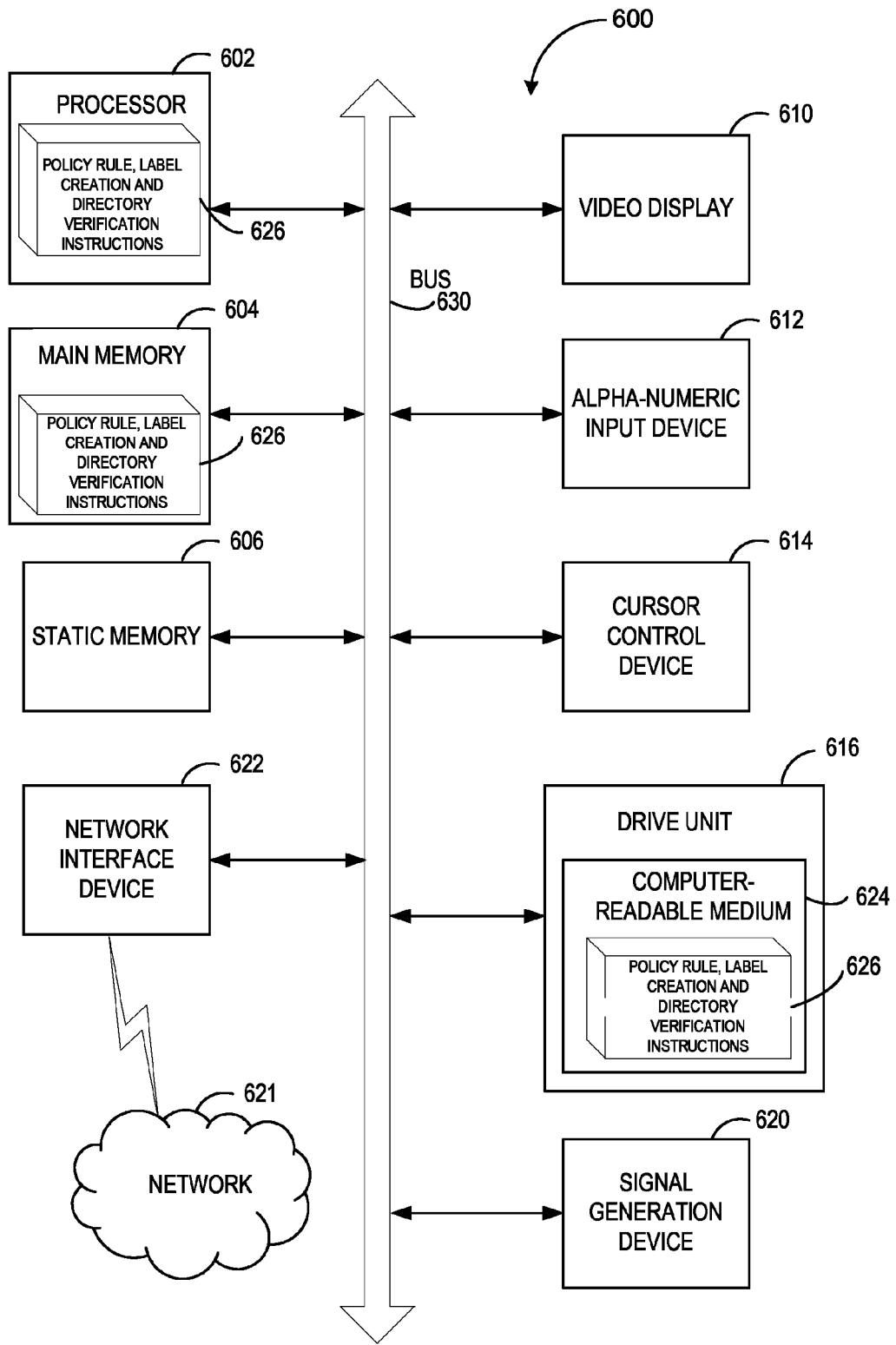
FIG. 6 illustrates a diagrammatic representation of a machine in the exemplary form of a computer system, in accordance with one embodiment.

FIG. 6 illustrates a diagrammatic representation of a machine in the exemplary form of a computer system 600 within which a set of instructions 626, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device), which communicate with each other via a bus 630.

The processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute authentication tool 300 for performing the operations and steps discussed herein.

The computer system 600 may further include a network interface device 622. The network interface device may be in communication with a network 621. The computer system 600 also may include a video display unit 610 (e.g., a liquid crystal display (LCD), a touch screen, or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a computer-readable storage medium (or more specifically a computer-readable storage medium) 624 on which is stored one or more sets of instructions 626 for the policy creation tool 104 and the labeling and directory verification subsystem 110 embodying any one or more of the methodologies or functions described herein. The instructions 626 for the policy creation tool 104 and the labeling and directory verification subsystem 110 may also reside, completely or at least partially, within the main memory 604 and/or within the processing device 602 during execution thereof by the computer system 600, the main memory 604 and the processing device 602 also constituting computer-readable storage media. The instructions 626 for the policy creation tool 104 and the labeling and directory verification subsystem 110 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions 626. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "creating," "associating," "maintaining," "receiving," "authenticating," "refraining," "identifying," "specifying," "determining," "granting," "accessing," "assigning," "executing," "monitoring," "detecting," "requesting," and "adjusting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    identifying, by an operating system executing on a processing device on a computing device, a request of a process to create a new object in a file system of the computing device;
    creating, by the operating system, an object label for the new object;
    identifying, by the operating system, one or more security policy rules for creating a security label for the new object applicable to the process, each of the one or more security policy rules using a label of the process and a class of the new object;
    verifying, by the operating system, whether the process is authorized to create the new object with the object label in the file system of the computing device using an applicable security policy rule;
    in response to verifying that the process is authorized to create the new object with the object label, creating, by the operating system, the new object with the object label in the file system of the computing device; and in response to verifying that the process is not authorized to create the new object with the object label, generating an error message.

2. The method of claim 1, further comprising:

in response to verifying that the process is authorized to create the new object with the object label, associating, by the operating system, the new object with the object label.

3. The method of claim 1, wherein the new object is any one of a file, a directory, or a sub-directory.

4. The method of claim 1, wherein the request of the process identifies a class of the new object, wherein the class of the new object is any one of a file, a directory, a character file or a block file.

5. The method of claim 1 wherein:

the request of the process identifies a parent object for the new object; and verifying whether the process is authorized to create the new object with the object label comprises verifying whether the process is authorized to create the new object with the object label in the parent object.

6. The method of claim 5, wherein the parent object pertaining to the new object is a directory.

7. The method of claim 1 wherein creating the object label for the new object comprises:

identifying, by the operating system, an object label policy rule applicable to the new object.

8. The method of claim 7 wherein the object label policy rule applicable to the new object specifies a portion of a name of the new object.

9. The method of claim 1, wherein the label for the new object is a label for a mandatory access control mechanism.

10. A method comprising:

receiving, by a processing device, user input identifying a label of a process, a class of a new object to be created by the process in a file system of a computing device, a parent label of a parent object for the new object, a name of the new object, and an object label of the new object;

defining a policy rule for creating a security label for the new object applicable to the process, the policy rule using a label of the process and a class of the new object, the policy rule for:

verifying that the process is authorized to create the new object with the object label in the parent object;

compiling the policy rule using a policy language compiler; and creating an operating system package using the compiled policy rule.

11. The method of claim 10 wherein the new object is any one of a file, a directory, or a sub-directory.

12. The method of claim 10, wherein the label for the new object is a label for a mandatory access control mechanism.

13. A system comprising:

a processing device to:

identify, by an operating system executing on the processing device on a computing device, a request of a process to create a new object in a file system of the computing device;

create, by the operating system, an object label for the new object;

identify, by the operating system, one or more security policy rules for creating a security label for the new object applicable to the process, each of the one or more security policy rules using a label of the process and a class of the new object;

verify, by the operating system, whether the process is authorized to create the new object with the object label in the file system of the computing device using an applicable security policy rule;

in response to verify that the process is authorized to create the new object with the object label, create, by the operating system, the new object with the object label in the file system of the computing device; and in response to verify that the process is not authorized to create the new object with the object label, generate an error message.

14. The system of claim 13, wherein the new object is any one of a file, a directory, or a sub-directory.

15. The system of claim 13, further comprising identifying a class of the new object, wherein the class of the new object is any one of a file, a directory, a character file or a block file.

16. The system of claim 13, further comprising identifying, by the operating system, an object label policy rule applicable to the new object.

17. The system of claim 16 wherein the object label policy rule applicable to the new object specifies a portion of a name of the new object.

18. The system of claim 13, wherein a parent object pertaining to the new object is a directory.

19. The system of claim 13, wherein the label for the new object is a label for a mandatory access control mechanism.

20. The system of claim 13, wherein the one or more security policy rules are a file transition rule of a policy for a mandatory access control mechanism.

21. A non-transitory computer readable storage medium comprising instructions to cause a processing device to:

identify, by an operating system executing the processing device on a computing device, a request of a process to create a new object in a file system of the computing device;

create, by the operating system, an object label for the new object;

identify, by the operating system, one or more security policy rules for creating a security label for the new object applicable to the process, each of the one or more security policy rules using a label of the process and a class of the new object;

verify, by the operating system, whether the process is authorized to create the new object with the object label in the file system of the computing device using an applicable security policy rule;

in response to verifying that the process is authorized to create the new object with the object label, create, by the operating system, the new object with the object label in the file system of the computing device; and in response to verifying that the process is not authorized to create the new object with the object label, generate an error message.

22. The non-transitory computer readable storage medium of claim 21, wherein the new object is any one of a file, a directory, or a sub-directory.

23. The non-transitory computer readable storage medium of claim 21, wherein the label for the new object is a label for a mandatory access control mechanism.

\* \* \* \* \*